3,459,128
EMULSION LACQUER CONTAINING ALKYL/
PHENOL RESIN FOR THE AFTER-TREAT-
MENT OF DEVELOPED PLANOGRAPHIC
PRINTING PLATES
Fritz Erdmann, Wiesbaden-Schierstein, and Fritz Uhlig,
Wiesbaden-Biebrich, Germany, assignors to Kalle
Aktiengesellschaft, Wiesbaden-Biebrich, Germany, a
corporation of Germany
No Drawing. Filed Nov. 4, 1966, Ser. No. 591,993
Claims priority, application Germany, Nov. 9, 1965,
K 57,608
Int. Cl. C08g 37/18; B41n 3/00
U.S. Cl. 101—466                                      10 Claims

ABSTRACT OF THE DISCLOSURE

This invention relates to an emulsion lacquer composition for reinforcing the image on a lithographic printing plate, the dispersing phase comprising water and a soluble thickener, and the dispersed phase comprising a volatile-water-immiscible solvent and a phenol-formaldehyde resin derived from a phenol having at least one substituent containing at least two carbon atoms.

Copending application Ser. No. 8,522, filed Feb. 15, 1960, relates to an emulsion lacquer for after-treating planographic printing plates comprising an aqueous phase which contains at least one organic water-soluble thickener and, if desired, one or more wetting agents and/or bactericides, and a non-aqueous phase which contains at least one organic solvent, at least one phenol/formaldehyde condensation product of the novolak type, and, if desired, one or more organic solvent-soluble dyestuffs and/or strongly ultra-violet radiation absorbing substances.

Emulsion lacquers of the composition stated above are used for reinforcing the printing areas of planographic printing plates and are applied after development of the printing plates. As the phenol resin component present, novolak condensates of formaldehyde with phenols or cresols or xylenols are employed.

The present invention relates to emulsion lacquers which contain at least one condensation product of the novolak type obtained from formaldehyde and phenols containing substituents having at least two carbon atoms.

This class of phenol/formaldehyde resins employed in the emulsion lacquers of the invention is designated in the literature as alkyl/phenol resins. It comprises also the resins derived from phenols which are substituted by aryl groups, hydroaryl groups or aralkyl groups.

The term "alkyl/phenol resins" comprises the so-called nonreactive alkyl/phenol resins, i.e. the novolaks, and the so-called reactive alkyl/phenol resins, i.e. the resols. It now has been found that the reactive alkyl/phenol resins also are suitable as components of the emulsion lacquers of the invention. The alkyl/phenol resins are condensates of linear construction or of annular form; annular products are especially formed when ample quantities of formaldehyde take part in the condensation.

The phenols may be substituted by saturated or unsaturated aliphatic hydrocarbon groups of cyclic or acyclic nature, or by aryl or aralkyl groups. Phenol/formaldehyde condensates suitable for use in the emulsion lacquers according to the invention are, therefore, such compounds which are prepared, e.g., from ethyl, propyl, isopropyl, hexyl, cyclohexyl or benzylphenols, or from oxidiphenyl, hexyl resorcinol, eugenol, iso-eugenol, thymol or carvacrol. Phenol/formaldehyde resins containing the following phenolic components are preferred as components of the emulsion lacquers of the invention: p-tert.-butyl phenol, p-amylphenol, p-octylphenol, p-isooctylphenol, and p-phenylphenol.

Alkyl/phenol resins are dealt with, e.g., in the monograph, "Lackkunstharze" (Synthetic Resin Lacquers), by H. Wagner and H. F. Sarx, published by Karl Hanser Verlag, Munich, 4th edition (1959), pp. 28, 44 and 55, and in the article, "Ring-Kondensate in Alkylphenolharzen" (Annular Condensates in Alkyl/Phenol Resins), by K. Hultzsch, published in the periodical, "Kunststoffe" (Plastics), 52nd Year (1952), vol. 1, pp. 19–24. Preparation and properties of the alkyl/phenol resins have been described in the periodical, "Industrial and Engineering Chemistry," vol. 33, (1941), p. 966, and in German Patent Specifications Nos. 565,413, 584,858, and 698,094. Alkyl/phenol resins have been commercially available for years. It is known from the literature— cf. the above-mentioned article by K. Hultzsch—that, besides methylene groups, these resins also may contain dimethylene ether bridges and, if obtained by condensation with hexymethylene tetramine, also dimethylene amine bridges ($-CH_2-NH-CH_2-$) and methylene azomethine bridges ($-CH_2-N=CH-$). Further, the alkyl/phenol resins may contain terminal methylol groups which, when heated above 150° C., react further with one another or with certain other, preferably unsaturated, reactants.

The aqueous phase of the emulsion lacquer of the invention comprises a colloid which serves to stabilize and thicken the emulsion lacquer and also to protect the non-image areas of the plate against oxidation. Organic, water-soluble, natural or synthetic colloids are suitable, e.g. gum arabic, gum tragacanth, alginates, carboxymethylcellulose (sodium salt), hydroxyethyl cellulose and methylcellulose. Further, the aqueous phase advantageously contains a wetting agent for additional stabilizing, e.g. Turkey-red oils, alkylnaphthalene sulfonic acids, condensation products of fatty acids, aralkyl sulfonates, fat alcohol sulfonates, or alkylaryl sulfonates. Further, a bactericide is advantageously added as a preservative, e.g. phenol, formaldehyde or chlorophenols.

The non-aqueous or organic phase contains at least one organic solvent. Suitable solvents are, e.g., aliphatic ketones, such as methylisobutyl ketone, ethylmethyl ketone, methylpropyl ketone, diisobutyl ketone, methylamyl ketone, and ethylamyl ketone; esters of aliphatic acids with aliphatic alcohols, such as amyl acetate, butyl acetate, methyl glycol acetate, ethylene glycol diacetate and ethylene glycol monacetate; further partially hydrolized aromatic hydrocarbons, such as tetrahydronaphthalene; and aromatic hydrocarbons, such as toluene and xylene.

The organic phase contains, in solution in the above solvents, one or more alkyl/phenol resins or mixtures of at least one alkyl/phenol resin with other resins known to be suitable as lacquer bases, in particular with the phenol/formaldehyde resins of the novolak type described in the copending application, supra. Further, the organic phase advantageously contains a dyestuff which is soluble therein, e.g. Pigmentrot B, Rhodamin B, Fettscharlach G, Litholrubin, Reinblau, Fettrot A, Echtscharlach, or Sudanschwarz. Further, it is advantageous to add to the organic phase a substance which strongly absorbs ultraviolet radiation, for additional protection of any still light-sensitive image areas against incident light. Benzophenone derivatives, e.g. dimethylbenzophenone, diethylbenzophenone or dihydroxybenzophenone, are, for example, suitable for this purpose.

In the preparation of the emulsion lacquer of the present invention, the components of the aqueous phase and those of the organic phase are first dissolved separately. Then, the organic phase is emulsified as a thin stream in the aqueous phase, using a highly effective agitator, and stirring is continued for 1 to 2 hours.

The emulsion lacquer of the invention may be applied as follows: A foil coated with a light-sensitive compound, preferably an aluminum foil, is exposed under a master and then treated with a suitable developer liquid, e.g. a dilute solution of trisodium phosphate, whereby the layer is removed in the non-image areas. Excess developer liquid is wiped off, and a quantity of emulsion lacquer corresponding to the size of the plate is applied, by means of a cotton pad, a cellulose sponge or a polyurethane application, to the plate while it is still wet with developer. The lacquer is evenly distributed over the plate by wiping the plate uniformly with the applicator carrying the lacquer.

Excess emulsion lacquer is removed by wiping or rinsing with water. A brief heating step, e.g. with a stream of warm air, will remove the last traces of the solvents and advantageously increase the printing run obtainable. The plate now is ready for printing and may be used for the preparation of prints after being clamped in a printing machine. Due to its good shelf-life, however, the plate also may be stored over a longer period of time and used for printing at a later date.

As compared with the emulsion lacquers of the copending application, supra, the emulsion lacquers of the present invention are more oleophilic and thus are more easily and more intensively absorbed by the printing areas. The printing areas of the planographic printing plates after-treated with these emulsion lacquers possess improved oleophilic properties and are less susceptible to attack by alcohols. The improved resistance to alcohols of the lacquered image is of considerable importance, because fountain solutions are increasingly being used, in offset printing, which contain about 30 percent by weight of alcohol, e.g. isopropanol. Since some of the lacquered images produced on printing plates with the emulsion lacquers hitherto known are soluble in lower molecular weight alcohols, they are attacked during the printing process by fountain solutions containing alcohols, so that the printing runs are considerably reduced.

The invention will be further illustrated by reference to the following specific examples:

Example 1

| Aqueous phase: | Grams |
|---|---|
| Gum arabic | 327 |
| Water | 1749 |
| Phenol | 3 |
| Wetting agent (sodium salt of alkylnaphthalene sulfonic acid) | 21 |

| Organic phase: | |
|---|---|
| Xylene | 90 |
| Decahydronaphthalene | 18 |
| Methylglycolacetate | 252 |
| Isopropanol | 360 |
| Pigmentrot B (Color Index 12070) | 15 |
| Pararosaniline | 9 |
| Tert.-butylphenol/formaldehyde resin (resol type) | 156 |

Equally good results are obtained when a hardenable terpenephenol resin is used instead of the tert.-butylphenol/formaldehyde resin.

Example 2

| Aqueous phase: | Grams |
|---|---|
| Gum arabic | 228 |
| Water | 1200 |
| Bactericide, e.g. pentachlorophenol | 2 |
| Wetting agent | 8 |

| Organic phase: | |
|---|---|
| Xylene | 66 |
| Tetrahydronaphthalene | 148 |
| Methylglycolacetate | 230 |
| Ceresrot B (Color Index 26110) | 2 |
| Pigmentrot B (Color Index 12070) | 10 |
| Isooctylphenol/formaldehyde resin (novolak type) | 100 |
| Silicone resin, e.g. the silicone resin commercially available under the trademark "Silikoftal L 5" | 6 |

Equally good results are obtained when a p-phenylphenol/formaldehyde resin is used instead of the isooctylphenol/formaldehyde resin.

Example 3

| Aqueous phase: | Grams |
|---|---|
| Gum arabic | 218 |
| Water | 1166 |
| Bactericide, e.g. phenol | 2 |
| Wetting agent, e.g. sodium salt of an alkylnaphthalene-sulfonic acid | 14 |

| Organic phase: | |
|---|---|
| Xylene | 60 |
| Decahydronaphthalene | 12 |
| Methylglycolacetate | 168 |
| Isopropanol | 240 |
| Pigmentrot B (Color Index 12070) | 10 |
| Pararosaniline | 6 |
| Phenol/formaldehyde resin (novolak) | 90 |
| Tert.-butylphenol/formaldehyde resin (novolak) | 8 |
| Silicone resin, e.g. the silicone resin commercially available under the trademark "Silikoftal L 5" | 6 |

It will be obvious to those skilled in the art that many modifications may be made within the scope of the present invention without departing from the spirit thereof, and the invention includes all such modifications.

What is claimed is:

1. An emulsion lacquer composition for reinforcing the image on a lithographic printing plate, the dispersing phase comprising water and a soluble thickener, and the dispersed phase comprising a volatile water-immiscible solvent and a phenol-formaldehyde resin derived from a phenol having at least one hydrocarbon substituent containing at least two carbon atoms.

2. An emulsion lacquer composition for reinforcing the image on a lithographic printing plate, the dispersing phase comprising water, a surfactant and a hydrocolloid, and the dispersed phase comprising a volatile water-immiscible solvent and a phenol-formaldehyde resin derived from a phenol having at least one hydrocarbon substituent containing at least two carbon atoms.

3. A lacquer according to claim 2 in which the hydrocolloid is selected from the group consisting of natural and synthetic gums.

4. A lacquer according to claim 2 in which the resin is a tert.-butylphenol/formaldehyde resin.

5. A lacquer according to claim 2 in which the resin is an isooctylphenol/formaldehyde resin.

6. A method for reinforcing the image on a lithographic printing plate comprising treating the image with an emulsion lacquer composition in which the dispersing phase comprises water and a soluble thickener, and the dispersed phase comprises a volatile water-immiscible solvent and a phenol-formaldehyde resin derived from a phenol having at least one hydrocarbon substituent containing at least two carbon atoms.

7. A method for reinforcing the image on a lithographic printing plate comprising treating the image with an emulsion lacquer composition in which the dispersing phase comprises water, a surfactant and a hydrocolloid, and the dispersed phase comprises a volatile water-immiscible solvent and a phenol-formaldehyde resin derived from a phenol having at least one hydrocarbon substituent containing at least two carbon atoms.

8. A method according to claim 7 in which the hydrocolloid is selected from the group consisting of natural and synthetic gums.

9. A method according to claim 7 in which the resin is a tert.-butylphenol/formaldehyde resin.

10. A method according to claim 7 in which the resin is an isooctylphenol/formaldehyde resin.

References Cited
UNITED STATES PATENTS

| | | | |
|---|---|---|---|
| 3,158,476 | 11/1964 | Uhlig | 93—33 |
| 3,294,866 | 12/1966 | Soldatos | 260—3 |
| 3,313,233 | 4/1967 | Uhlig et al | 101—467 |
| 3,378,372 | 4/1968 | Vandeputte et al. | 96—33 |
| 2,582,239 | 1/1952 | Dodd | 260—29.3 |

WILLIAM H. SHORT, Primary Examiner

E. M. WOODBERRY, Assistant Examiner

U.S. Cl. X.R.

96—33; 260—14, 29